No. 846,693. PATENTED MAR. 12, 1907.
C. A. PARSONS, G. G. STONEY & A. H. LAW.
ROTATING MAGNET FOR DYNAMO ELECTRIC MACHINES.
APPLICATION FILED AUG. 21, 1906.

Attest:
Edward N. Parton
L. B. Middleton

Inventors:
Charles A. Parsons.
George G. Stoney.
Alexander H. Law.
by Spear, Middleton, Donaldson & Spear.
Attys.

UNITED STATES PATENT OFFICE.

CHARLES ALGERNON PARSONS, GEORGE GERALD STONEY, AND ALEXANDER HENRY LAW, OF NEWCASTLE-UPON-TYNE, ENGLAND; SAID STONEY AND LAW ASSIGNORS TO SAID PARSONS.

ROTATING MAGNET FOR DYNAMO-ELECTRIC MACHINES.

No. 846,693.     Specification of Letters Patent.     Patented March 12, 1907.

Application filed August 21, 1906. Serial No. 331,455.

*To all whom it may concern:*

Be it known that we, CHARLES ALGERNON PARSONS, GEORGE GERALD STONEY, and ALEXANDER HENRY LAW, subjects of the King of Great Britain and Ireland, and residing at Heaton Works, Newcastle-upon-Tyne, in the county of Northumberland, England, have invented certain new and useful Improvements in Rotating Magnets for Dynamo-Electric Machines, of which the following is a specification.

Our invention relates to rotating field-magnets or rotors of dynamo-electric machines, and particularly to the rotors of high-speed alternators.

In the rotors of high-speed alternators, particularly such as are driven by steam-turbines, the number of poles required is small in order to obtain the periodicities in common use. It is usual to allow that component of the centrifugal force of the coils which acts along the poles to be taken upon the projection of the pole-tips; but in the case of a two-pole machine the forces at right angles to this are usually greater than the forces along the pole and with four or other small number of poles may be very considerable.

Our invention consists in constructing the rotating field-magnets in such a manner that the centrifugal forces to which the coils are subjected are more satisfactorily and economically met.

The invention further consists in a construction for the rotors of high-speed alternators of a moderate number of poles in which the winding of each pole of the rotor is subdivided into two or more coils and secured by bolts passing through the spaces between coils, whereby the coils are efficiently supported against centrifugal force, while at the same time better ventilation of the rotor or more space for the conductors and for iron is obtained.

Our invention further consists in the rotors hereinafter described.

Figure 1:
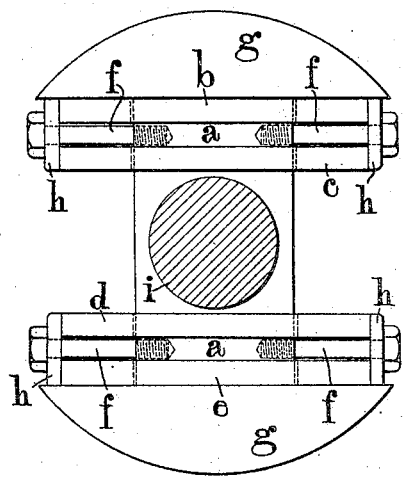
Figure 2:
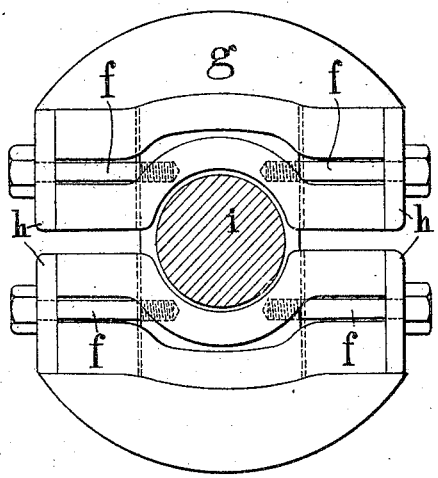
Figure 3:
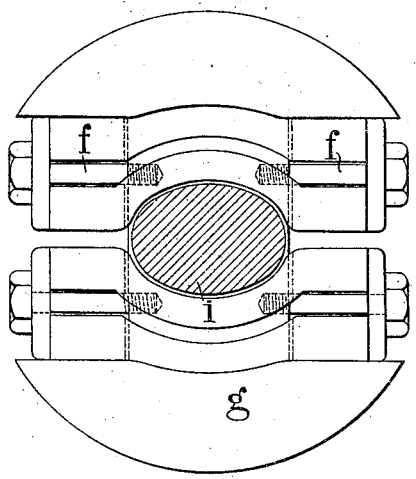
Figure 4:
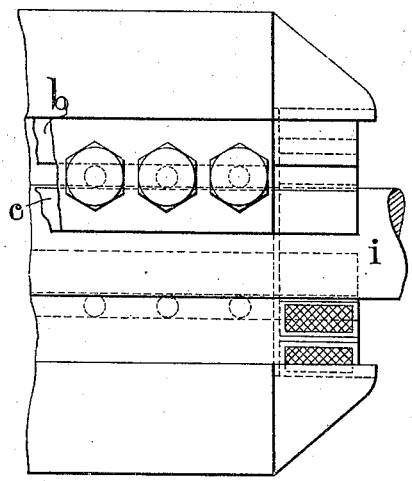

Referring now to the accompanying diagrammatic drawings, Figure 1 represents a rotor constructed according to one form of our invention, Figs. 2 and 3 representing modifications of the same; and Fig. 4 is a view at right angles to Fig. 3.

In all the drawings like reference-letters refer to corresponding elements.

In carrying our invention into effect in the form illustrated in Fig. 1 as applied to a rotor having poles $a$, with shoes $g$, the windings are divided into magnetizing-coils $b\ c\ d\ e$, and the said coils are secured in a direction at right angles to the pole by means of bolts $f$, passing between adjacent coils, such as $b\ c$, into the pole-cores $a$. In this form the bolts are fastened at one end into the pole-core, the other ends clamping the coils through suitable clamping-plates or the like $h$.

The bolts may, if preferred, be made of flattened, oval, or other section, so as to take up less space, and the outer ends of the bolts may be threaded to take nuts, as in the forms illustrated, or cotters or any suitable means may be used to secure the coils in place. The bolts may, if desired, pass through the body of the rotor, and any form of bolt may be used, either dovetailed into the rotor or screwed in, as illustrated in the drawings, or the bolt may be made with a solid head of such a shape as to hold the coils securely with or without the use of clamping-plates or washers.

In some cases instead of putting the bolts between the coils, as above described, we may pass them through holes in the coils, suitable insulation being provided, or one large coil may be used with holes in it for the reception of the bolts. This arrangement is especially useful where the coil consists of wide copper strips suitably insulated.

In order to allow the coils to pass the shafts at the ends of the rotor, as illustrated in Fig. 2, the conductors may be narrowed away locally, thus reducing the section of copper at these points; but this reduction being only local, as in the above case, where the bolts pass through the coils, the heat-conducting power of the copper windings is sufficient to prevent undue heating at these points, or, if preferred, reduction of area may be prevented while retaining this method of clearing the shaft by narrowing the conductors in one direction to effect the desired object and correspondingly widening them in another direction. Alternatively the shaft may be cut away locally to give room for the coils or may, if desired, be made wider and of an oval or oblong section at this point, so as not to reduce strength and stiffness, this form of the invention being illustrated in Figs. 3 and 4, wherein the shaft $i$ is of an oval form at this part.

In carrying the invention into effect in the form illustrated in Fig. 2 the coils are bent to a radius at the ends, so as to clear the shaft, this being conveniently accomplished by pressing the copper strip into a die by hydraulic or screw presses or other means, the die being made to release the coil after this has been bent. According to our invention, also, the oval or flattened shaft may be used with narrow or bent conductors, or both, if desired.

Extra subdivision may be provided at the ends of the rotor to facilitate the dissipation of any greater amount of heat which may be generated if the coils are reduced in section at this point.

It will be seen that the thinning of the coils is applicable also to magnets, transformers, continuous-current armatures, compensating windings, and other parts of electrical machinery where it is desired to reduce the section of the windings locally. Also it will be seen that the space between the coils obtained by dividing them as above described is of great utility during the construction of the rotor, as by removing the bolts or before they are placed in position the coils after being wound in place can be efficiently and conveniently insulated by lapping with tape or in any other suitable manner.

Having now described our invention, what we claim as new, and desire to secure by Letters Patent, is—

1. In dynamo-electric machinery, a wound rotor comprising a shaft, a core having projecting pole-tips integral therewith and perpendicular to the axis of rotation, separate coils wound round said core, and bolts placed transversely across said coils, as and for the purposes described.

2. In dynamo-electric machinery, a wound rotor, comprising a shaft, a core having projecting pole-tips integral therewith, coils on said core, said coils being of reduced cross-section in proximity to said shaft, as and for the purposes described.

3. In dynamo-electric machinery, a wound rotor, comprising a shaft having one diameter longer than the other, a core having projecting pole-tips integral therewith, and coils on said core, as and for the purposes described.

4. In dynamo-electric machinery, a wound rotor comprising a shaft, a core having projecting pole-tips integral therewith, coils on said core, said coils being of reduced cross-section and being bent outward in proximity to said shaft as and for the purposes described.

5. In dynamo-electric machinery, a wound rotor, comprising an oval shaft, a core having projecting pole-tips integral therewith, coils on said core, said coils being bent outward and of reduced cross-section in proximity to said shaft, as and for the purposes described.

6. In dynamo-electric machinery, a wound rotor, comprising a shaft, a core having projecting pole-tips integral therewith, coils on said core, said coils being of reduced cross-section in proximity to said shaft, and means for dissipating heat from said reduced portions, as and for the purposes described.

In testimony whereof we affix our signatures in presence of two witnesses.

CHARLES ALGERNON PARSONS.
GEORGE GERALD STONEY.
ALEXANDER HENRY LAW.

Witnesses:
HENRY GRAHAM DAKYNS, Jr.,
WILLIAM SHEARER.